United States Patent [19]

Pirck et al.

[11] 3,954,719

[45] May 4, 1976

[54] PROCESS FOR THE PRODUCTION OF A SINGLE-COMPONENT POWDER RESIN FOR USE IN ELECTROSTATIC POWDER SPRAY COATING PROCESSES

[75] Inventors: Dietrich Pirck, Reinbek; Gündolf Füchs, Steinbeck-Meilsen, both of Germany

[73] Assignee: Deutsche Texaco Aktiengesellschaft, Hamburg, Germany

[22] Filed: Oct. 2, 1974

[21] Appl. No.: 511,411

[30] Foreign Application Priority Data

Oct. 13, 1973 Germany............................ 2351477

[52] U.S. Cl. ................. 260/77.5 CR; 260/77.5 TB; 427/27; 526/14; 526/50; 526/55; 526/272
[51] Int. Cl.² ........................................... C08F 8/30
[58] Field of Search ................ 260/78.5 T, 77.5 CR, 260/77.5 TB

[56] References Cited
UNITED STATES PATENTS

| | | | |
|---|---|---|---|
| 3,646,044 | 2/1972 | Sekmakas ...................... 260/29.6 H |
| 3,741,943 | 6/1973 | Sekmakas ...................... 260/78.5 T |
| 3,752,793 | 8/1973 | Arlt et al. ...................... 260/78.5 T |
| 3,784,528 | 1/1974 | Pirck et al. ...................... 260/78.5 T |
| 3,867,347 | 2/1975 | Felber et al. ...................... 260/63 UX |

*Primary Examiner*—John Kight, III
*Attorney, Agent, or Firm*—T. H. Whaley; C. G. Ries; Bernard Marlowe

[57] ABSTRACT

This invention describes a process for the production of a single-component resin powder useful in electrostatic spray coating processes by the formation of partially esterified and alkoxylated copolymers obtained through the reaction of vinyl-aromatic hydrocarbons with alpha, beta-unsaturated dicarboxylic acid anhydrides which are subsequently half-esterified and thereafter the resultant carboxyl group of which is alkoxylated with $C_2$ to $C_4$ alkene oxides. Said copolymer is reacted with a monoblocked diisocyanate between 110° and 130°C in the melt form until said single-component resin powder is formed.

5 Claims, No Drawings

3,954,719

PROCESS FOR THE PRODUCTION OF A SINGLE-COMPONENT POWDER RESIN FOR USE IN ELECTROSTATIC POWDER SPRAY COATING PROCESSES

STATEMENT OF THE INVENTION

This invention broadly relates to the production of resin powders useful in electrostatic spray coating applications.

More particularly, this invention relates to the preparation of single-component resin powders useful as material for electrostatically applied coatings or films.

BACKGROUND OF THE INVENTION AND RELATED PRIOR ART

With the increased use of powdered polymeric coatings or films, interest has grown in fusion bond coating processes for inexpensively protecting metal surfaces for a variety of applications. These include protection from outdoor weathering, low order corrosion (such as encountered in subsurface burial applications) high order corrosion, and for extending the "life" of electrical insulation on rotors, stators, coils, and assorted pole line hardware. While there are several different powder coating techniques available, the instant invention is directed toward resin powders for electrostatic spray coating processes.

Electrostatic spray coating processes are defined herein refers to procedures that operate on the principle that oppositely charged particles attract each other. Resin powders are fed from a reservoir, often from a fluidized bed to a "gun" by air pressure. There is a high voltage, low amperage electrostatic charge is applied. The resin powder picks up the charge due to a transfer of electrons from gun to powder. This transfer takes place both through contact with the highly charged gun nozzle and through the surrounding ionized air.

Interest in electrostatic processes has substantially increased in view of the development of powdered resins with powdered cross-linking agents along with auxiliary agents promote the application of plastic coatings without the necessity of employing solvents thereby minimizing air pollution.

Two-component systems of hydroxy-containing copolymers and polyisocyanate as the cross-linking agent form a special group of useful resin powders. The polyisocyanate cross-linking agent is employed in blocked form in these systems, i.e., all isocyanate groups are blocked with agents that can be split off only at baking temperatures so that the mixture of hydroxyl groups-containing copolymer and cross-linking agent has good storage properties at ambient or slightly elevated temperatures.

For example, German Auslegeschrift No. 1,957,483 discloses a powdered coating material of polyester containing hydroxyl-groups and of a ε-caprolactam-blocked polyisocyanate, e.g. hexamethylene diisocyanate. This system does not react when being short time heated to temperatures of up to 130°C., and is curable at temperatures of about 150°C. The Auslegeschrift also mentioned that partially blocked isocyanates, e.g. mono-ε-caprolactam-blocked diphenylmethyl-4,4'-diisocyanate, can also be employed but it is stated that no more than one free isocyanate group may be present per molecule otherwise a premature cross-linking of the components may take place during the mixing of the two components.

Another relevant disclosure German Offenlegungsschrift No. 2,105,777 describes a two-component coating resin mixture. One component of the mixture is a polyester containing hydroxyl groups, the second component is ε-caprolactam-blocked isophorone diisocyanate which is used as the cross-linking agent. Two-component resins with volatile blocking agents are in some respects disadvantageous: A sizable portion of the blocking agent is lost as a gas during the baking of the resin mixture. This results not only in a loss in material but also in a bad effect on the surface appearance of the spray coatings. The greater the loss in blocking agent, the more is the film quality deteriorated.

In the process disclosed in German Auslegeschrift No. 1,957,483 either a single-component or two-component coating resin or lacquer can be produced. However, the use of an aromatic diisocyanate as the cross-linking agent as claimed in said Auslegeschrift impairs the coatings' resistance to light and weather.

As can be appreciated from the discussion supra the development of a single-component coating resin or lacquer which would obviate the problems and disadvantages of the prior art two-component resin mixtures would represent a substantial advance in the art.

It is therefore an object of this invention to provide a single-component powdered resin for use in electrostatic powder-spray coating devices, which would be capable of baking in the shortest possible time and would produce coatings, lacquers or films having improved properties, especially a high gloss.

In the broadest practice contemplated, a hydroxyl containing copolymer is reacted with a mono-blocked diisocyanate while the mixture is in the melt stage, then cooled and pulverised to form a powdered, blocked single-component resin especially useful for electrostatic spray coating applications.

The hydroxyl-containing copolymer used in the practical application of the invention, is formed by copolymerising a vinylaromatic hydrocarbon with an alpha,-beta- unsaturated dicarboxylic acid anhydride, subsequently half-esterifying the copolymer with an aliphatic alcohol or a glycol monoether, and alkoxylating the resultant half-esterified copolymer with an alkylene oxide.

In order to further aid in the understanding of the inventive concept, the following additional disclosure is submitted.

A. HYDROXYL-CONTAINING COPOLYMERS

The copolymers which when combined with mono-blocked diisocyanate form the single-component resins for electrostatic coating applications, may be prepared according to the process described in Applicant's U.S. patent application Ser. No. 272,091 of July 14, 1972. According to the process described therein a vinylaromatic hydrocarbon of from 8 to 12 carbon atoms is copolymerised with an alpha,beta-unsaturated dicarboxylic acid anhydride. The copolymerisation is carried out in a hydrocarbon solvent in the presence of a dispersing agent. According to the present invention, the mole ratio of vinylaromatic hydrocarbon-to-dicarboxylic acid may be of about 3 : 1 to 6 : 1, preferably 4 : 1. Subsequently, the copolymer is half-esterified with an aliphatic alcohol or a monoglycol ether having from 3 to 12 carbon atoms. Thereafter, the half-esterified reaction product is contacted with an alkylene oxide having from 2 to 4 carbon atoms. The mole ratio of alkylene oxide to initial alpha,beta-unsaturated dicarboxylic acid may be in the range of between about 1 : 1 and 1 : 2.

The copolymerisation, the half-esterification and the alkoxylation to form the hydroxyl-containing copolymer, may be carried out in a hydrocarbon solvent in the amount of between about 0.5 and 3.0 wt.% related to the combined weight of the vinylaromatic hydrocarbon and the alpha,beta-unsaturated dicarboxylic acid of a dispersing agent. These dispersing agents which may be used, are also described in the above mentioned U.S patent application and consist of a copolymer of an alkene having from 2 to 6 carbon atoms or a vinylaromatic hydrocarbon of from 8 to 12 carbon atoms and one or more esters of alkanols having from 10 to 20 carbon atoms and alpha,beta-unsaturated dicarboxylic acids having from 4 to 5 carbon atoms.

When the alkoxylation is finished the solvent and the volatile by-products are removed by thin film evaporation at about 200°C under atmospheric pressure to obtain a resin having a volatile matter content of not more than 1 wt.%.

The vinylaromatic hydrocarbons suitable for the synthesis of the hydroxyl-containing copolymer are, e.g., styrene, alpha-methylstyrene, vinyl toluenes, vinyl xylenes, alkyl styrenes having from 2 to 4 carbon atoms in the alkyl group. Maleic acid, fumaric acid and citroconic acid stand as examples for alpha,beta-unsaturated dicarboxylic acids which can be employed. Straight-chain and branched alcohols having from 1 to 8 carbon atoms belong to the group of alcohols with which the dicarboxylic acids may be esterified. Suitable glycol monoethers are, e.g. glycol monopropylether, glycol monobutyl-ether, glycol monohexylether.

The alkoxilation is usually performed with ethylene oxide or propylene oxide.

B. BLOCKED DIISOCYANATE HARDENERS (CROSS-LINKING AGENTS)

Melamine resins well known curing agents in solvent-based lacquers are not suitable as hardeners in powder resins due to the splitting off formaldehyde at curing temperature thus causing the undesirable effects of volatile matter mentioned above. Moreoever, severe problems of odor and toxicity arise which are less harmful in curing solvent-based lacquers where in any case a combustion of effluent gases is necessary.

Although the use of one type of isocyanate hardeners, dicaprolactam-blocked isophorone diisocyanate when mixed with the copolymers containing hydroxyl groups as described above yield a free-flowing resin powder, it is yet unsuited for said copolymer systems since the films or coatings are very brittle and hence unsatisfactory. On the other hand, the di-ε-caprolactam-blocked saturated aliphatic diisocyanates yield good lacquer films but the resin-hardener mixture does not even lend itself to satisfactory processing to a powdered form by pulversation or sieving since it has a tendency to form lumps. At a 2-weeks-storage at 50°C the material has been totally sintered while a powder resin is expected to remain a free flowing powder after such a treatment, so this blocked isocyanate hardener is also unsatisfactory for electrostatic spray applications.

Quite unexpectedly, it has been found that the above mentioned difficulties of storage, the mixture of said copolymer and blocked isocyanate hardener as well as the production of a lacquer (or coating) having undesirable properties can be overcome by admixing that copolymer as described herein in Section A. with a mono-blocked diisocyanate hardener at the melting temperature of the resin hardener mixture. While the patentability of this invention is not postulated upon any particular mechanism it is believed that at the melting temperature of the resin-isocyanate mixture the free isocyanate groups of the hardener react with a portion of the hydroxyl groups of the copolymer to form a single-component resin permitting the remaining hydroxyl groups-blocked isocyanate groups to react with each other and cross-link the resin when subjected to baking temperatures.

The powdered single-component resins are not only storable but also have excellent spraying properties (including very good edge coverage) and further result in films or lacquers having superior properties.

Suitable saturated aliphatic diisocyanate include among others tetramethylene diisocyanate, pentamethylene diisocyanate and trimethyl hexamethylene diisocyanate with hexamethylene diisocyanate being preferred.

Aromatic diisocyanate such as toluene diisocyanate may also be used. However as mentioned supra, generally the use of aromatic diisocyanate as the cross-linking agent produce lacquer films having inferior stability to light compared to those resin coatings or films produced when aliphatic diisocyanate are employed as cross-linking agents.

Generally, from 15 to 45 parts by weight, preferably from 20 to 25 parts by weight, of mono-blocked diisocyanate per 100 parts by weight of hydroxyl-containing copolymer may be employed in the process of the invention. The "melt"-reaction is conducted at a temperature of between 110° and 130°C. and within 30 to 5 minutes.

According to the following Examples, substrates are spray-coated with the single-component resin powders of the invention and the coatings are tested according to the respective DIN Standards, summarised in the table below. The maximum values attainable in these tests are indicated in the last column of said table.

| TEST | DIN Nos. | Maximum values attainable |
|---|---|---|
| Erichsen deepening | 53 156 | 9 – 10 mm |
| Dorn bending test | 53 152 | 2 mm |
| Pendulum hardness | 53 157 | 180 – 190 seconds |
| Cross-cut adhesion | 53 151 | 0 |
| Gloss at 20° |  | 100 |
| Impact | 53 156 | 5 –6 |
| Elrepho yellowing | 5053 | 0/negative values indicate yellowing |

The gloss (gloss at 20°) is determined as follows:

The reflexion of a coating in comparison with a black plate-glass pane is tested by directing a light ray at an angle of incidence of 20° upon a plate-glass pane and determining the reflexion via a photo electric cell. The Amperemeter is standardized. Subsequently, the same light ray is directed at an angle of incidence of 20° upon the test sample and the reflexion is read off the Ampere-meter in per cent.

EXAMPLE 1

Production of a Mono-Blocked Hydroxyl-Containing Copolymer

A. Production of the copolymer, similar to the aforementioned U.S. patent application Ser. No.

272,091

Stage 1

A vessel equipped with a stirrer and having an operating pressure of at least 5 ata was charged with 508 kg of an aromatic hydrocarbon solvent medium having a boiling range of from 110° to 150°C and 41.8 kg pf a 20 wt.% solution of a dispersing agent consisting of a 1 : 1 mole ratio isobutylene to maleic acid half-ester copolymer, said maleic acid having been esterified with an alkanol mixture of from 12 to 18 carbon atoms, said copolymer dispersant having a k-value of 36. The esterifying alcohols employed in the preparation of the dispersant are sold under the tradename "Alfols" and are synthetic primary alkanols derived from the Ziegler process and recovered from aluminium alkoxides by means of hydrolysis. The resultant mixture was heated to a temperature of 180°C and the following substances were charged thereto within a 1 hour period:

640 kg of styrene
150 kg of maleic acid anhydride
23,4 kg of ditertiary butylperoxide Under the foregoing reaction conditions, a medium viscous and coagulum free copolymer suspension was formed at almost quantitative reaction, said suspension being maintained for an additional 2 hours at a temperature of 175°C after stopping the adding of monomers. The k-value of the resultant maleic acid anhydride-styrene copolymer was 15.5.

Stage 2

A mixture of
180 kg of 2-butoxyethanol
0.8 kg of phosphoric acid was added within 1 hour to the resultant suspension of Stage 1 still having reaction temperature. During this partial esterification reaction, the suspended polymer solid is gradually transformed into an almost clear resin solution without the formation of a polymer smear. At a 3 hours' time of esterification, from 2 to 3 kg of the reaction by-product water are discharged.

Stage 3

The esterified product obtained from Stage 2 was cooled down to a temperature of 125°C and mixed with 51 kg of catalyst solution consisting of about 34 kg of water, 14.5 kg of methylglycol and 2.5 kg of the potassium salt of maleic acid monobutylester.

Ethylene oxide in an amount of 134 kg was added to this mixture within 1 hour and the reaction temperature was maintained at 125°C for 6 hours. Subsequently, the excess ethylene oxide was removed by venting at reaction temperature. The resin solution so obtained is freed from solvent and volatile by-products by means of a thin film evaporation at 200°C and normal pressure resulting in a solid resin with

| | |
|---|---|
| non-volatile matter | > 99% |
| acid number | 1.2 mg KOH/gr. of substance |
| melt viscosity at 180°C | 50 cp |
| hydroxyl number | 110 mg KOH/gr. of substance |

B. Reaction of said copolymer with the mono-blocked diisocyanate

Said copolymer was allowed to react with 200 grams of hexamethylene diisocyanate-caprolactam-monoadduct in the presence of 0.005 percent by weight of n-propylamine at 110°C in the melt stage.

The resin melt obtained after a reaction time of 30 minutes was cooled and pulverised and had a melting range of 90° to 130°C and could be cross-linked at 175° to 220°C within a period of from 30 minutes to 5 minutes, yielding an elastic film.

EXAMPLE 2

Utilization of the Product of Example 1 in an Electrostatic Spray Process

A 1000 gram portion of the non-cross-linked product of Example 1 for use as resin powder was melted with 30 percent titanium white pigment added by 0.4 percent of silicone oil (levelling improver) and 2.5 percent of an epoxide resin in a dispersion extruder and homogenized. After grinding and sieving, the particle size of 100 to 20 μ was applied onto metal substrates by means of an electrostatic spray apparatus.

The powder showed excellent spraying properties and covered the edges very well. Coated test sheets had the following lacquer values after baking for 30 minutes at 175°.

| | |
|---|---|
| Erichsen deepening | 8.6 mm |
| Dorn bending test | 2 mm |
| Pendulum hardness | 170 sec. |
| Cross-cut adhesion | Gt 0 to 1 |
| Gloss, 20° | 95 |
| Impact deepening | 3 mm |
| Elrepho-yellowing | −2.5 |

EXAMPLE 3 (Comparative Example)

A 1000 gram portion of the same glycol monoether-esterified and subsequently ethoxylated 4 : 1 styrene/maleic acid anhydride copolymer of Example 1 A. for use as a powder resin were melted with 500 grams of di-blocked isophorone diisocyanate, 30 percent titanium white pigment, added in 0.4 percent of silicone oil and 5 percent of an epoxy resin produced with bisphenol A ( EPICOTE 1004), in the dispersion extruder, and homogenized.

The powder showed good spraying properties and good covering of edges but poorer mechanical properties. Elctrostatically coated test sheets had the following lacquer values after being baked for 30 minutes at 175°.

| | |
|---|---|
| Erichsen deepening | 4.1 mm |
| Dorn bending test | 25 mm |
| Pendulum hardness | 163 sec. |
| Cross-cut adhesion | 2 to 3 |
| Gloss, 20° | 88 |
| Impact deepening | 1 mm |
| Elrepho-yellowing | −9.44 |

This example demonstrates the unsuitability of the commercial cross-linking agent for powder resin lacquers, di-ε-caprolactam-blocked isophoronediisocyanate when used as cross-linking agent for the hydroxyl copolymers employed in the process of the invention. The lacquers are brittle and inflexible (which is primarily demonstrated by comparing the values of the Erichsen test and the Dorn bending test); apart from the intensive yellowing occurring.

EXAMPLE 4

Example 1 was repeated with the modification that the ethoxylated copolymer was replaced by a propoxylated copolymer. This copolymer had a hydroxyl number of 105 mg KOH/gr. of substance and an acid number of 0.5 mg KOH/gr. of substance. 190 grams of hexamethylene diisocyanate caprolactam-monoadduct were added, and the procedure of Example 1 was continued. The product had a somewhat lower sinter point of about 45°C than that produced according to Example 1.

EXAMPLE 5

The product of Example 4 was admixed with pigment and auxiliary agents as described in Example 2. As to its properties with respect to processing and application, there were no differences observed in comparison to the product of Example 4. The following lacquer values were obtained.

|  |  |
|---|---|
| Erichsen deepening | 9.0 mm |
| Dorn bending test | 3 mm |
| Pendulum hardness | 153 sec. |
| Cross-cut adhesion | Gt 0 |
| Gloss, 20° | 90 |
| Impact deepening | 3 mm |
| Elrepho-yellowing | −3 |

As the preceding illustrations and examples indicate this process is advantageous in both its process and quality of the products obtained. For example, it was advantageous and unexpected to find that a single-component resin powder with superior properties for electrostatic applications could be produced by admixing hydroxyl copolymers with mono-blocked aliphatic diisocyanates at melt temperature without gelation (gel formation) resulting in a mixture which formed after cooling a storable resin product having an appreciably higher sinter point than the corresponding two-component system.

What is claimed is:

1. A process for the preparation of a single-component resin powder for use in electrostatic spray coatings applications by the steps of:

a. forming a hydroxyl-containing copolymer by copolymerising a vinylaromatic hydrocarbon of from 8 to 12 carbon atoms with an alpha,beta-unsaturated dicarboxylic acid anhydride in a liquid hydrocarbon solvent medium in the presence of a dispersing agent, the mole ratio of said vinylaromatic hydrocarbon to said dicarboxylic acid anhydride being in the range of about 3 : 1 to 6 : 1, and subsequently half-esterifying the copolymer with aliphatic alcohols or glycol monoethers having from 3 to 12 carbon atoms and then alkoxylating the resultant about half-esterified copolymer with an alkylene oxide of from 2 to 4 carbon atoms, the mole ratio of alkylene oxide to initial alpha,beta-unsaturated dicarboxylic acid anhydride being in the range of between about 1 : 1 and 1 : 2; removing the solvents and volatile products by thin film evaporation at about 200°C and normal pressure to obtain a resin having not more than 1% by weight of volatile matter;

b. reacting said hydroxyl-containing copolymer obtained from (a) at a temperature of about 110°C to about 130°C with a mono-blocked diisocyanate until said single-component resin is formed; and c. pulverising said single-component resin after cooling to a powdered form having particle sizes ranging between 100 micron and 20 micron.

2. The process of claim 1, wherein the said hydroxyl-containing copolymer is reacted with a mono-blocked aliphatic diisocyanate.

3. The process of claim 2 wherein the said hydroxyl-containing copolymer is reacted with a mono-ε-caprolactam-blocked hexamethylene diisocyanate to form a single-component resin powder.

4. The process of claim 1 wherein per 100 parts by weight of the hydroxyl-containing copolymer from about 15 to 45 parts by weight of mono-blocked diisocyanate are employed.

5. The process of claim 1 wherein in step (a) the vinylaromatic hydrocarbon is styrene, the alpha,beta-unsaturated acid anhydride is maleic acid anhydride and the alkoxide is ethylene oxide.

* * * * *